Nov. 27, 1951     C. L. WATKINS     2,576,736

WHEEL

Filed May 23, 1949

C. L. Watkins
INVENTOR

BY *Ch Snowles.*

ATTORNEYS.

Patented Nov. 27, 1951

2,576,736

UNITED STATES PATENT OFFICE 2,576,736

WHEEL

Charles L. Watkins, Corsicana, Tex.

Application May 23, 1949, Serial No. 94,787

1 Claim. (Cl. 152—397)

This invention relates to a construction for a wheel for a penumatic tire.

An important object of the present invention is to provide a construction, in a wheel of the type stated, which will result in increased stability regardless of tire size, an improved cushioning effect, and a lessening of the possibility of serious accident on loss of air from the tire.

Another object is to provide a tire in which the bead of the casing will be fastened to the rim in a manner whereby it will not work loose or slip.

Another object is to provide a tire which can be of the tubeless type having a concave surface above and adjacent its bead, in which a sealing gasket of soft resilient material can seat.

Another important object is to provide a construction of the character described which lends itself readily to the use of tubeless tires.

Another important object is to provide a construction as described wherein the tire can be mounted or dismounted speedily and with facility.

Still another important object is to provide a construction in a wheel of the type stated wherein the above mentioned desirable objects will be attained while yet permitting manufacture of the wheel and tires therefor at relatively low cost.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
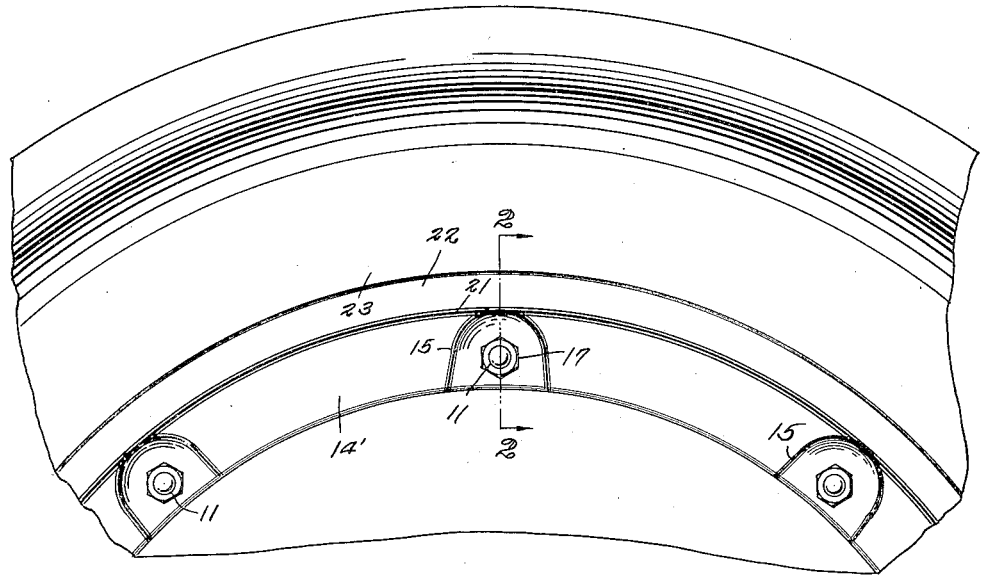
Fig. 1 is a fragmentary side elevational view of a wheel and tire in accordance with the invention.
Figure 2:
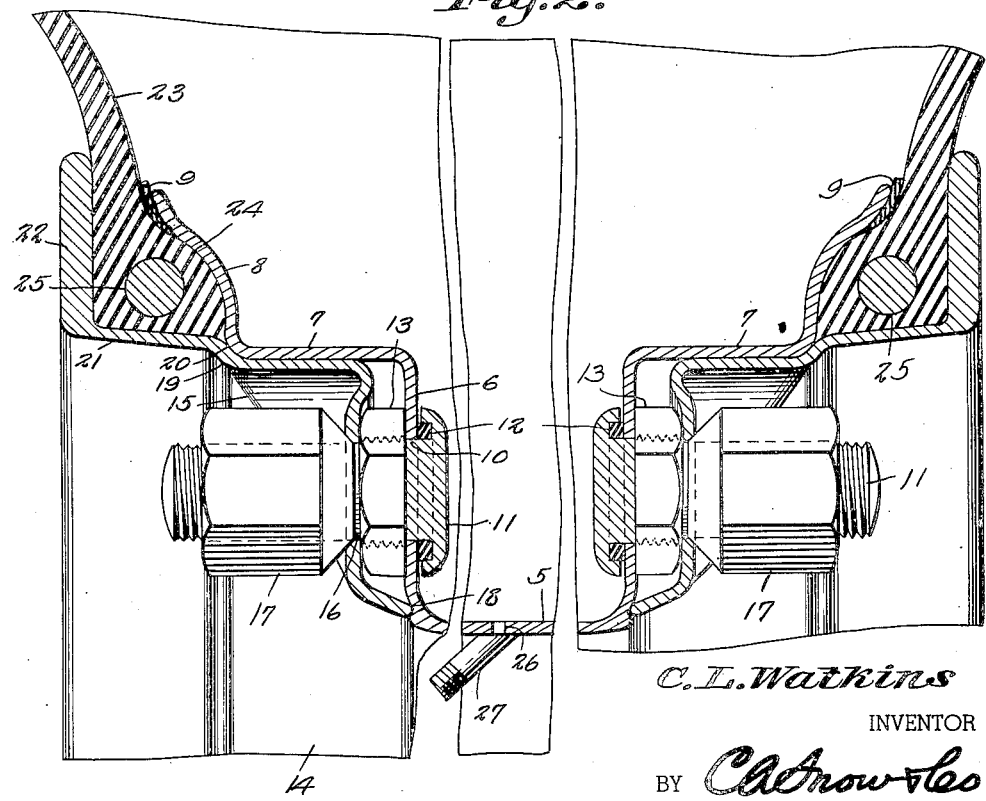
Fig. 2 is an enlarged fragmentary section on line 2—2 of Fig. 1.

Referring to the drawings in detail I provide a wheel rim of drop center construction including the annular center portion 5 from the opposite edges of which extend the side walls 6 here shown as vertically disposed, the side walls 6 merging in turn into the laterally and outwardly extended side portions 7, and the side portions 7 being formed integrally with outwardly and obliquely extended marginal flanges 8. The flanges 8 are transversely curved inwardly, and adjacent their outer edges press against and are engaged by the annular gaskets 9 of resilient material such as soft rubber. The gaskets 9 preferably extend beyond the edges of the flanges 8 so as to cushion said edges. Formed in the side walls 6, and spaced circumferentially of the wheel rim, are the openings 10, receiving bolts 11 carrying the gaskets 12 which, when compressed between the heads of the bolts and the side walls 6, prevent leakage through the openings 10.

Nuts 13 thread on the outwardly and laterally projected shanks of the bolts, against the outer surfaces of the side walls 6, so that the bolts will be rigidly and securely fixed in position upon the wheel rim, to receive a retaining band 14. The retaining bands 14 are mounted on opposite sides of the wheel rim, and have annularly disposed inner portions 14' formed at spaced intervals with the recesses 15 having the openings 16 for receiving the bolts 11. Nuts 17 thread on the bolts for tightening the retaining band to the wheel rim. It will be noted that when the nuts 17 are tightened upon the bolts 11, the inner edge 18 of the inner portion 14' will be one contact point between the retaining band and wheel rim, while an offset 19 along the outer edge of the inner portion 14' constitutes the other contact point with the wheel rim, said offset 19 having engagement with the curved inner edge of flange 8.

The offset 19 of the retaining band merges into the angular marginal extension 21 having formed on its outer edge the thickened clamping flange 22. It will be noted that the marginal extension 21, clamping flange 22, and flange 8 of the wheel rim define between them a space approximately triangular in cross section for receiving the correspondingly shaped bead of tire casing 23, said bead being designated 24 and having molded therein the steel cable 25. When the retaining band is secured to the wheel rim, with the tire bead clamped between the flanges, there can be no possibility of the bead pulling away from the rim.

It should additionally be noted that although in the present invention a construction has been illustrated in which the width of the inflated tire is greater than the overall width of the wheel rim, it is entirely possible that the rim and tire will be coextensive in width, without departure from the spirit of the invention.

In use, it will be understood that the retaining bands would first be removed, after which the tire casing is positioned with its bead against the flanges 8. Then, the retaining bands are mounted upon the bolts 11, and tightened in position. The beads of the tire, being formed of resilient material, are accordingly compressed and comprise their own sealing means, for preventing leakage of air around the bead of the casing.

With a construction as illustrated and described, greater stability is obtained, regardless of the tire size. At the same time, the invention permits the use of a wide rim, by reason of the bead being held out against the outermost portions of the rim, and thus the advantages of a large tire are obtained while still retaining the stability of a small tire. In skidding, the tread will be held under the wheel, and in the case of a puncture, the tire is held in place for safety with the tube also being preserved in those cases in which a tube is used.

What is claimed is:

A vehicle wheel including a wheel rim having a dropped center the side walls of which are parallel with each other and with the plane in which the wheel lies, an annular side portion integral with each side wall and extending laterally and outwardly from the dropped center portion substantially at right angles to said side walls, and outwardly and obliquely extended marginal flanges integral with the respective side portions; retaining bands mounted upon said rim at opposite sides thereof, said retaining bands including annular inner portions approximately parallel to the side walls of the dropped center portion of the rim, marginal extensions underlying and having slidable contact with the side portions of the rim, and clamping flanges substantially parallel with the side walls of the dropped center portion of the rim, said clamping flanges marginal extensions and obliquely extended marginal flanges of the wheel rim defining annular recesses of approximately triangular cross sectional configuration for clamping of a correspondingly shaped tire bead; and means carried by and extending outwardly from the respective side walls of the dropped center portion and engaging said retaining bands for drawing said retaining bands toward the side walls and slidably adjusting the marginal extensions of the retaining bands along the side portions of the wheel rim to clamp a tire bead in said recess.

CHARLES L. WATKINS.

REFERENCES CITED

The following references are of record in the file of this patent:

UNITED STATES PATENTS

| Number | Name | Date |
| --- | --- | --- |
| 1,637,599 | Ballew | Aug. 2, 1927 |
| 1,842,219 | Trautman | Jan. 19, 1932 |

FOREIGN PATENTS

| Number | Country | Date |
| --- | --- | --- |
| 615,614 | Germany | July 5, 1934 |